US008489985B2

(12) United States Patent
Bao et al.

(10) Patent No.: US 8,489,985 B2
(45) Date of Patent: Jul. 16, 2013

(54) AUTOMATICALLY ADJUSTING A WEBPAGE

(75) Inventors: Shenghua Bao, Beijing (CN); Jian Chen, Beijing (CN); Zhong Su, Beijing (CN); Chunhua Tian, Beijing (CN); Dong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 13/170,778

(22) Filed: Jun. 28, 2011

(65) Prior Publication Data

US 2012/0005573 A1    Jan. 5, 2012

(30) Foreign Application Priority Data

Jun. 30, 2010   (CN) .......................... 2010 1 0216083

(51) Int. Cl.
*G06F 17/00* (2006.01)
(52) U.S. Cl.
USPC ........................................................ 715/243
(58) Field of Classification Search
USPC .................. 715/243, 244, 245, 246, 247, 251
See application file for complete search history.

(56) References Cited

U.S. PATENT DOCUMENTS

| | | | | |
|---|---|---|---|---|
| 5,835,905 | A * | 11/1998 | Pirolli et al. ........................ | 1/1 |
| 6,480,885 | B1 * | 11/2002 | Olivier ........................ | 709/207 |
| 6,489,968 | B1 * | 12/2002 | Ortega et al. ................. | 715/713 |
| 7,290,006 | B2 * | 10/2007 | Xie et al. .............................. | 1/1 |
| 8,244,740 | B2 * | 8/2012 | Gruenhagen et al. ......... | 707/751 |
| 8,271,878 | B2 * | 9/2012 | Kane et al. .................... | 715/733 |
| 2002/0178232 | A1 * | 11/2002 | Ferguson ....................... | 709/217 |
| 2005/0022114 | A1 * | 1/2005 | Shanahan et al. ............. | 715/513 |
| 2006/0112346 | A1 * | 5/2006 | Miksovsky et al. ........... | 715/764 |
| 2006/0277455 | A1 * | 12/2006 | Yamada et al. ............ | 715/501.1 |
| 2007/0050336 | A1 * | 3/2007 | Bugir et al. ........................ | 707/3 |
| 2007/0130525 | A1 | 6/2007 | Murphy | |
| 2008/0288889 | A1 * | 11/2008 | Hunt et al. .................... | 715/810 |
| 2009/0254820 | A1 * | 10/2009 | Farouki et al. ................. | 715/273 |
| 2011/0184827 | A1 * | 7/2011 | Hubert ........................ | 705/26.1 |
| 2011/0202847 | A1 * | 8/2011 | Dimitrov ....................... | 715/738 |
| 2012/0005132 | A1 * | 1/2012 | Horvitz et al. .................. | 706/12 |

OTHER PUBLICATIONS

A. Georgakis, et al., User behavior modeling and content based speculative web page prefetching, Data & Knowledge Engineering, vol. 59, Issue 3, Dec. 2006, pp. 770-788.

Tech Superb, Zoom and annotate any screen on your computer with Zoomit, http://www.techsuperd.com/soft/zoom-annotate-screen-zoomit/451.html.

(Continued)

*Primary Examiner* — Laurie Ries
(74) *Attorney, Agent, or Firm* — Eustus Dwayne Nelson; Anne Vachon Dougherty

(57) ABSTRACT

A solution is provided for automatically adjusting a webpage. According to the method of the present invention it can be automatically learned what the user's historical browsing behaviors are and thereby predict which block in the webpage would interest the user more so that it would be the one to be browsed and then adjust display of the block accordingly. Thus, with the present invention, limited screen resources can be utilized to more efficiently display the content that would interest a user when the user browses a webpage. A system for automatically adjusting a webpage and a computer readable article of manufacture tangibly embodying non-transitory computer readable instructions which, when executed, cause a computer to carry out the steps of a method for automatically adjusting a webpage, are also provided.

20 Claims, 6 Drawing Sheets

OTHER PUBLICATIONS

Baudisch, et al., Collapse-to-Zoom: Viewing Web Pages on Small Screen Devices by Interactively Removing Irrelevant Content, Proceedings of the 17th annual ACM symposium, 2004.

Sugiyama, et al., Adaptive Web Search Based on User Profile Constructed without Any Effort from Users, Proceedings of the 13th international conference on World Wide Web, 2004.

Yoo, et al., The Seamless Browser: Enhancing the Speed of Web Browsing by Zooming and Preview Thumbnails, Proceeding of the 17th international conf on World Wide Web, 2008.

* cited by examiner

AUTOMATICALLY ADJUSTING A WEBPAGE

CROSS-REFERENCE TO RELATED APPLICATION

This application claims priority under 35 U.S.C. §119 from Chinese Patent Application No. 201010216083 filed Jun. 30, 2010, the entire contents of which are incorporated herein by reference.

BACKGROUND OF THE INVENTION

1. Field of the Invention

The present invention relates to a method and a system for processing a webpage, and more particularly, to a method and system for automatically adjusting a webpage.

2. Description of Related Art

The font size and picture size in webpage browsing are determined by default font sizes. Default font sizes are user adjustable to a certain extent. However, users can only magnify or minify the font size in a webpage as a whole and cannot adjust the font size for a particular block in the webpage. FIG. 1A illustrates a screen capture of a webpage regarding the Augmented Reality technology from the website Wikipedia, where fonts in the webpage generally have a smaller size. If users want to obtain a better visual effect, he or she can magnify the content in the webpage by adjusting the font size. FIG. 1B illustrates a screen capture of the webpage in FIG. 1A after it is magnified. It can be seen from FIG. 1B that the webpage, which includes a left panel frame, a middle content frame, and an upper head frame, is magnified as a whole, and letters and pictures in the content frame are magnified simultaneously.

In actual applications, users can frequently have to adjust a webpage because of eyesight problem or limitation in display screen size. However, users often focus on some blocks of the webpage content, not all of them. For example, for the webpage in FIG. 1A, some users can focus more on literal parts in the content frame, while other users can focus more on pictorial parts in the content frame. If the webpage content is magnified as a whole, the content that users do not care at all about can also be magnified, thereby wasting screen resources and dampening the user's visual experience. This problem is especially notable for a display with a small screen (for example, a small-sized laptop or mobile phone). For such kind of displays, if all content in the webpage is displayed in a same proportional size, the limited screen resources can not be utilized efficiently, and further users have to constantly drag the scroll bar in the right of the screen so as to comprehensively browse all the content that they desired.

The prior art has some proposed methods of manipulating some content in a webpage, for example, the US patent application No. US2007/0130525A1. In the patent application, first, blocks in the webpage are analyzed and partitioned; after the blocks are partitioned, a user manually selects a block of interest, and then the browser re-maps the user's block of interest to adapt it to the screen size (for example, scale-up, transforming, scrolling, and floating). However, this solution imposes an additional operation flow on the user access to the webpage as the user has to manually select the block of interest, which interferes with the user's browsing mode and surely dampens user experience.

SUMMARY OF THE INVENTION

The present invention provides a solution of automatically adjusting a webpage. In the solution of the present invention, a user does not need to select a block of interest manually. The present invention can automatically learn the user's historical browsing behaviors to thereby predict which block can be more of interest to the user in the webpage that is to be browsed and then adjust display of the block (for example, magnifying the font). By applying the present invention, when a user browses a webpage, the limited screen resources can be utilized more efficiently to display the content that the user is interested in.

One aspect of the present invention provides a method for automatically adjusting a webpage, including: obtaining a browsed webpage; analyzing the browsed webpage to identify an actual focal block in the browsed webpage; recording a focal feature of the actual focal block of the browsed webpage; obtaining a target webpage; predicting a potential focal block of the target webpage based on the focal feature; and adjusting display of the target webpage.

Another aspect of the present invention provides a system for automatically adjusting a webpage, including: browsed page obtaining means configured to obtain a browsed webpage; analyzing means configured to analyze the browsed webpage to identify an actual focal block in the browsed webpage; recording means configured to record a focal feature of the actual focal block of the browsed webpage; target webpage obtaining means configured to obtain a target webpage; predicting means configured to predict a potential focal block of the target webpage based on the focal feature; and adjusting means configured to adjust display of the target webpage.

Another aspect of the present invention provides a computer readable article of manufacture tangibly embodying non-transitory computer readable instructions which, when executed, cause a computer to carry out the steps of a method for automatically adjusting a webpage, the method including the steps of obtaining a browsed webpage; analyzing the browsed webpage to identify an actual focal block in the browsed webpage; recording a focal feature of the actual focal block of the browsed webpage; obtaining a target webpage; predicting a potential focal block of the target webpage based on the focal feature; and adjusting display of the target webpage.

BRIEF DESCRIPTION OF THE DRAWINGS

The accompanying drawings as referenced in the present description are only for typical embodiments for illustrating the present invention, which should not be regarded as limitation to the scope of the present invention.

DETAILED DESCRIPTION OF THE PREFERRED EMBODIMENTS

Hereinafter, a great number of specific details are provided to help thoroughly understand the present invention. However, it is apparent to the skilled in the art that even without these specific details, the understanding on the present invention will not be affected. Further, it should be realized that use of any of the following specific terms is only for the convenience of depiction, and thus the present invention should not be limited to any particular application expressed and/or implied only by these terms.

The present invention provides a solution for automatically adjusting a webpage. In the solution of the present invention, a user needs not manually select a block of interest. The present invention can automatically learn the user's historical browsing behaviors to thereby predict which block can be more of interest to the user in the webpage that is to be browsed and then adjust display of this block (for example, magnifying the font). By applying the present invention, when a user browses a webpage, the limited screen resources can be utilized more efficiently to display the content that the user is interested in.

Figure 1A:
FIG. 1A illustrates a screen capture of a webpage regarding the Augmented Reality technology from the website Wikipedia.
Figure 1B:
FIG. 1B illustrates a screen capture of the webpage in FIG. 1A after it is magnified.
Figure 2:
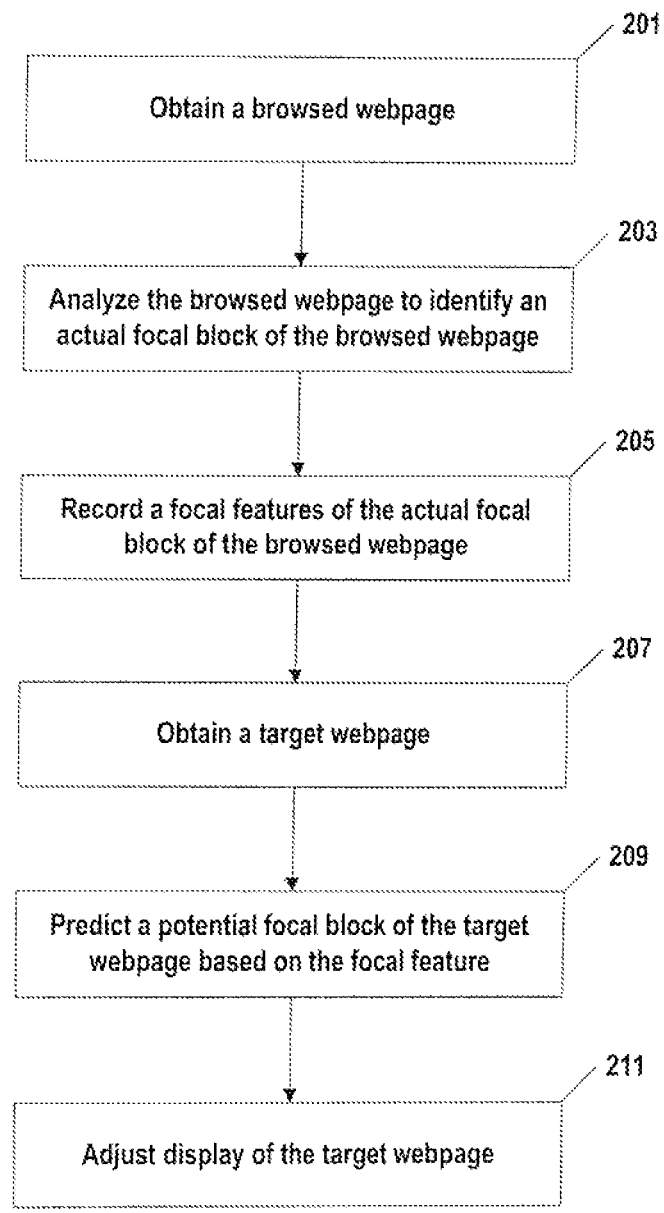
FIG. 2 illustrates a flowchart of a method for automatically adjusting a webpage.

FIG. 2 illustrates a flowchart of a method for automatically adjusting a webpage. At step 201, a browsed webpage is obtained. The present invention automatically obtains a block that is of interest to a user by learning the user's browsing history; thus, it is necessary to first obtain a webpage already browsed by the user.

According to one embodiment of the present invention, the browsed webpage can be partitioned into a plurality of blocks. The webpage can be partitioned using source codes of the webpage. The source codes of a webpage can include HTML codes, XML codes, or other structured or semi-structured languages.

Figure 3:
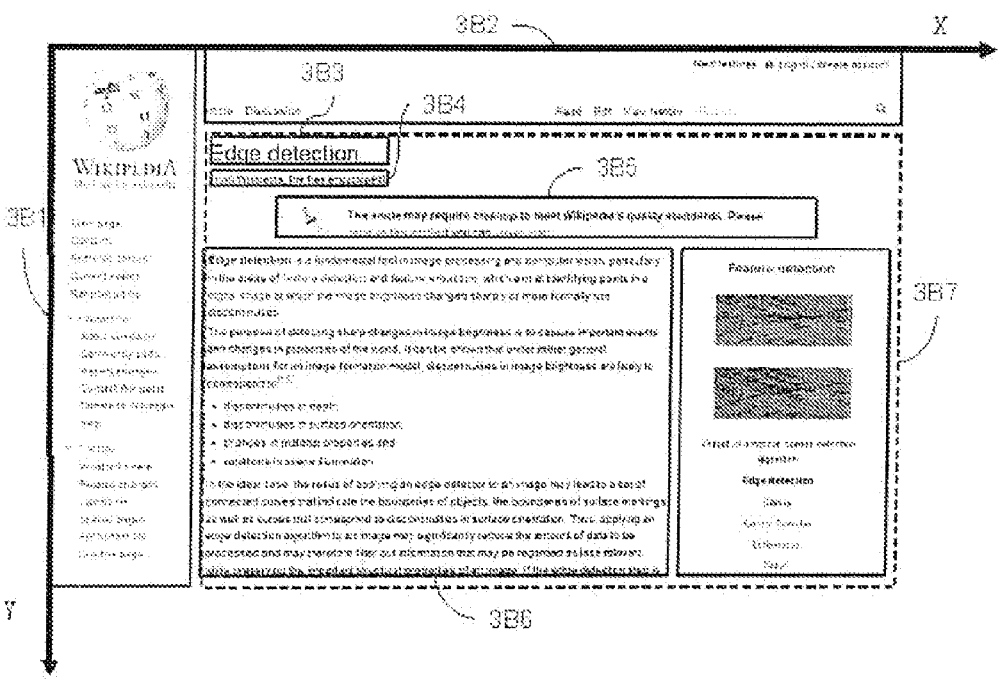
FIG. 3 illustrates a diagram of a partitioned browsed webpage according to one embodiment of the present invention.

FIG. 3 illustrates a diagram of a partitioned browsed webpage according to one embodiment of the present invention. From this figure, it can be seen that the webpage is partitioned into 7 blocks. HTML codes have many tags that control the display effect. Meanwhile, each block of content in a webpage is presented in a hierarchical manner in the HTML code. For example, in the webpage as illustrated in FIG. 3, the webpage is partitioned into header element <head></head> and body element <body></body>. The body element further includes many other elements, for example, the DIV element with the tag <div id="mw-head-base"> corresponds to 3B2 in FIG. 3, the DIV element with the tag <div id="mw-panel"> corresponds to 3B1 in the figure, and the DIV element with the tag <div id="bodyContent"> corresponds to the content in the dashed block in the figure. Further, in the DIV element with the tag <div id="bodyContent">, the element with the tag <h1 id="firstHeading"> corresponds to 3B3 in the figure, the element with the tag <h3 id="siteSub"> corresponds to 3B4 in the figure, the element with the tag <table class="metadata plainlinks ambox ambox-style"> corresponds to 3B5 in the figure, the element with the tag <p>Edge detection is a . . . </p> corresponds to 3B6 in the figure, and the element with the tag <table class="infobox"> corresponds to 3B7 in the figure.

The present invention has no special limitation on the granularity for partitioning a webpage. FIG. 3 is merely one partition solution of an exemplarily presented webpage. Actually, the present invention can also employ a partition solution with a finer granularity or a coarser granularity. The HTML code can be regarded as a tree structure. Each element in the tree structure can be regarded as a node. In the present invention, a partitioned block of a webpage can be a leaf node in the tree structure or a non-leaf node in the tree structure. In other words, it can only represent one node in the tree structure or represent a combination of a plurality of nodes in the tree structure.

Referring back to FIG. 2, at step 203, the browsed webpage is analyzed to identify an actual focal block in the browsed webpage. By identifying the actual focal block, a location of a block that is usually focused on by the user in a similar page can be determined. For example, if the user usually focuses more on the literal part in the content, then the block 3B6 in FIG. 3 can be the user's actual focal block; if the user usually focuses more on the pictorial part in the content, then 3B7 in FIG. 3 can be the user's actual focal block. In some relatively simple web pages, for example, the webpage like that as illustrated in FIG. 3, the focal blocks that interest the user can be relatively concentrated so that most users can focus more on the literal part. However, in some complex web pages, focal blocks that interest the user can be more dispersed. In other words, each user can focus on different blocks. For example, the structure of the website http://asia.wsj.com/home-page is more complex. Different users can focus on different blocks. Some users can focus more on the stock information in the right side, some users can focus more on headlines in the left side, and some users can focus more on the news list in the middle.

Actual focal areas can be identified through one or more of a block location, a block size, a mouse state, and a browsing record. According to one embodiment of the present invention, analyzing the browsed webpage to identify an actual focal block in the browsed webpage includes scoring blocks in the browsed webpage based on one or more of the following items: a block location score $S_1$, a block size score $S_2$, a mouse state score $S_3$, and a browsing record score $S_4$.

In this example, the block location refers to the absolute location of a block in the webpage. In other words, regardless whether the block is browsed by the user or not, its location remains unchanged. For example, as to the webpage in FIG. 3, the webpage can be divided into a horizontal (X) vertical (Y) coordinate system, where the origin of the coordinate system is the left upper corner of the whole webpage, and the location at the left upper corner of a block is regarded as the location of the block, namely the number of pixels of the left upper corner of this block in the X-coordinate and Y-coordinate are used to represent the location of the block. For example, the location of block 3B6 is X=30, Y=50. Suppose the currently processed focal block is targetObj. In Javascript language, the horizontal coordinate X on the left upper corner of the block can be obtained through the function targetObj.x, and the longitudinal coordinate Y of the left upper corner of the block can be obtained through targetObj.y.

The block location score $S_1$ can be set based on the block location. In one embodiment, the X-coordinate score $S_{1x}$ and Y-coordinate score $S_{1y}$ are calculated in advance based on the X-coordinate and Y-coordinate of the left upper corner of a block. If it is supposed that the upper half part of a webpage attracts more attention than the lower half part and the right half part of a webpage will attract more attention than the left half part, or more specifically, it is supposed that an empirical value indicates that the location of a webpage with Y=100 pixels and X=60 pixels often attracts more focus, then various kinds of mathematical functions (for example, a Gaussian function) can be employed to design some location score models, such that the more the Y coordinate of a block approaches 100, the higher the $S_{1y}$ score is, while the further it is from 100, the lower the $S_{1y}$ score is; and the more the X coordinate approaches 60, the higher the $S_{1x}$ score is, while the further it is from 60, the lower the $S_{1x}$ score is. Then, weight summing is performed to $S_{1x}$ and $S_{1y}$ as illustrated in Formula 1. Finally, the score after weight summing is subjected to normalization processing such that it is defined to be a value between 0 and 1 as the block location score $S_1$.

$$S_1 = W_x \times S_{1x} + W_y \times S_{1y} \qquad \text{Formula 1}$$

In other embodiments, the horizontal and longitudinal coordinates at the right upper corner, left lower corner, right lower corner, and central position or other position of a block can also be used to represent the location of the block.

Block size refers to the absolute size of a block in a webpage. In other words, whether this block is browsed by the user or not, and regardless of the browsing window size when the user browses, the block size remains unchanged. In Javascript language, a width of a block can be obtained through a targetObj.width function, and a height of a block can be obtained through a targetObj.height function. In one embodiment of the present invention, it is supposed that the larger a block is, the more likely it attracts attention, and the higher the block size score $S_2$ is. Likewise, $S_2$ can also be subjected to normalization processing such that it is defined as a value between 0 and 1 as the block size score $S_2$.

The mouse state refers to an action of the mouse that takes place on a block, which can be one or more of mouse clicking, mouse hovering, and mouse selecting. In this example, the action of mouse clicking can be obtained through the document.onclick function, the duration of mouse hovering can be calculated through event.clientX and event.clientY, and the action of mouse selecting can be obtained through document.seleciton.createRange( ).text function in conjunction with the document.onMouseUp function. It is supposed that for a block, the more times the mouse clicks, the more attention the block attracts; the longer time the mouse hovers on the block, the more attention the block attracts; or the longer time or the more times the selecting action of the mouse is performed on the block, the more attention the block attracts. According to one embodiment of the present invention, the mouse state score $S_3$ is a weight sum of the mouse clicking score $S_{3c}$, mouse hovering score $S_{3p}$ and mouse selecting score $S_{3s}$ (as illustrated in Formula 2 below). Likewise, $S_3$ can also be subjected to normalization processing such that it is defined as a value between 0 and 1 as the mouse state score $S_3$.

$$S_3 = W_c \times S_{3c} + W_p \times S_{3p} + W_s \times S_{3s} \qquad \text{Formula 2}$$

Sometimes, although no mouse clicking, mouse hovering or mouse selecting actions occur on some blocks, these blocks can also appear in the user's browsing window.I It can be regarded that such blocks are also the blocks focused by the user. Browsing record indicates whether a block appears in the user's browsing window or not, and if it appears in the browsing window, whether the appearing location is the location focused on by the user. In order to obtain a browsing record of a block, the location of the browsing window should be obtained first. The location of left upper corner of the browsing window with respect to the webpage can be calculated through the document.body.scrollTop function and document.body.scrollLeft function, and then the size of the browsing window is obtained through the window.width function and the window.height function, thereby working out the location of the browsing window with respect to the whole webpage and the area it occupies.

According to one embodiment of the present invention, it can be supposed that if a larger area in a block appears in the browsing window, the more likely this block attracts attention; and if the location of a block is closer to the right bottom corner of the browsing window, the more likely this block attracts attention. The more likely the block attracts attention, the higher the browsing record score $S_4$ is. Likewise, $S_4$ can also be subjected to normalization processing such that it is defined as a value between 0 and 1 as the browsing record score $S_4$.

The present invention only makes an illustration with block location score $S_1$, block size score $S_2$, mouse state score $S_3$, and browsing record score $S_4$ as examples. However, besides $S_1$, $S_2$, $S_3$, and $S_4$, the present invention can employ more scores in other embodiments as actually required. Moreover, the present invention is not limited to the above-mentioned modeling manner of calculating $S_1$, $S_2$, $S_3$, and $S_4$. In actual applications, various models can be employed to determine the values of $S_1$, $S_2$, $S_3$, and $S_4$ using various kinds of models as actually required.

After the values of $S_1$, $S_2$, $S_3$, and $S_4$ are obtained, a total focal score of a block can be calculated through Formula 3 below:

$$TS(B_k) = \sum_{i=1}^{N} (w_i * S_i) \qquad \text{Formula 3}$$

where $B_k$ denotes the $k^{th}$ block; TS ($B_k$) denotes the total focal score of the $k^{th}$ block; $S_i$ denotes the $i^{th}$ focal score of the $k^{th}$ block; $W_i$ denotes a weight of the $i^{th}$ focal score of the $k^{th}$ block; and N denotes a number of respective focal scores that are employed in calculating the total focal score. The higher the TS($B_k$) value is, the more attention the block $B_k$ is attracted by the user. Take FIG. 3 as an example. It is supposed that the block 3B6 is the actual focal block of the user.

At step 205 in FIG. 2, a focal feature of the actual focal block of the browsed webpage is recorded. According to one embodiment of the present invention, the focal feature of the actual focal block of the browsed webpage includes a location of the actual focal block in the browsed webpage and a size of the actual focal block. In some cases, the user often focuses on a block of a similar website in a same location. For example, when browsing the website Wikipedia, many people focus more on the literal content in the block 3B6, thus although the user searches different keywords in the Wikipedia each time, the location and size of the blocks that the user looks at are similar to a certain extent. In this case, the location of the actual focal block in the browsed webpage and the size of the actual focal block are focal features of reference significance.

According to another embodiment of the present invention, the focal feature of the actual focal block of the browsed webpage includes the topic of the actual focal block. In some cases, the location and size of focal block, when the user accesses different websites, can change notably. For example, assume a user focuses more on stock information. Website A can list the stock information in the left side of the webpage, while website B can list the stock information in the right side of the webpage. Therefore, it can be hard to predict the focal block based on the location and size of the block. In this case, the topic of the actual focal block can be recorded as the focal feature. The topic is not necessarily a caption of a segment of words, but can be a topic of words, picture or video, which is extracted using the text analysis technology.

According to a further embodiment of the present invention, the focal feature of the actual focal block of the browsed webpage includes the location of the actual focal block in the browsed webpage and the size of the actual focal block, as well as the content of the actual focal block. In some cases, combining the above three can record the focal feature more comprehensively.

The focal feature can be extracted based on the actual focal block of a webpage or extracted by making statistics on the focal features of actual focal blocks of a plurality of web pages.

At step 207, a target webpage is obtained. According to one embodiment of the present invention, the target webpage is the requested webpage. In other words, regardless of whether the webpage requested by the user is similar to the webpage that has been browsed by the user, the subsequent step of predicting a potential focal block of the target webpage will be performed.

According to another embodiment of the present invention, the target webpage is a requested webpage that has a similarity degree greater than a threshold with respect to the browsed webpage, and the method further includes determining whether the requested webpage has a similarity degree greater than a threshold with respect to the browsed webpage from at least one of the following items: webpage layout, webpage topic, webpage type, and webpage URL. Webpage layout refers to layouts of two web pages; webpage topic refers to the main theme content as discussed in a webpage; webpage type refers to some classifications of a webpage (for example, news type and blog type); webpage URL refers to the uniform resource locator of a webpage, where through the URL it can be determined whether or not the target webpage comes from a same website as the browsed webpage. In other words, only the requested webpage similar to the browsed webpage is predicted with respect to the focal block. The advantage of doing so is that the prediction efficiency for a potential focal block can be improved. However, in this embodiment, additional computation cost is required to determine whether the target webpage has a similarity degree greater than a threshold with respect to the browsed webpage.

Figure 4A:
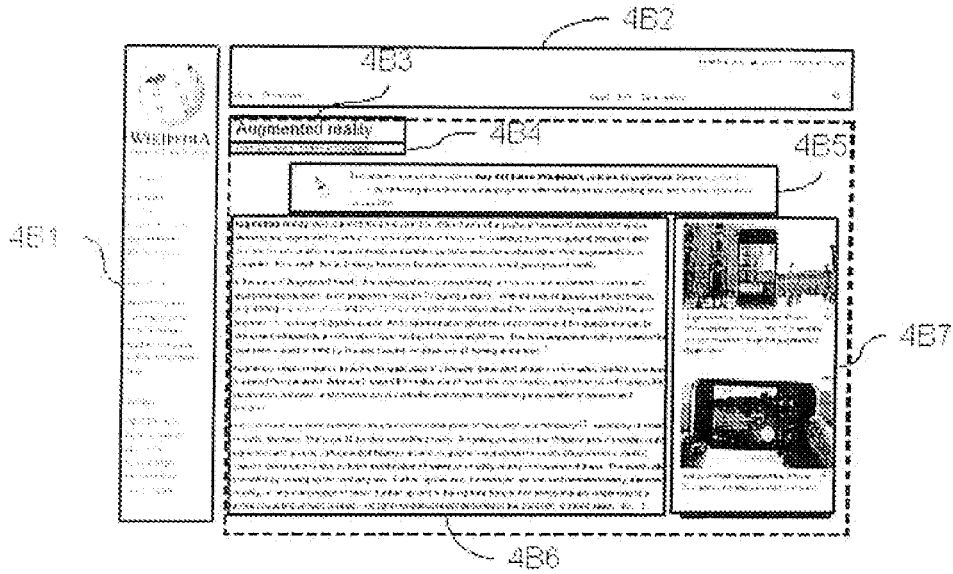
FIG. 4A illustrates a diagram of a partitioned target webpage according to one embodiment of the present invention.

FIG. 4A illustrates a diagram of a partitioned target webpage according to one embodiment of the present invention. According to one embodiment of the present invention, similar to the webpage processing as illustrated in FIG. 3, for the target webpage in FIG. 4A, the target webpage is also partitioned into a plurality of blocks. The partition method is similar to the content as depicted in FIG. 3, which will not be detailed here. In the example of FIG. 4A, the target webpage comes from the same website as the browsed webpage. However, as previously mentioned, the present invention is not so limited. In other words, the target webpage can come from a website different from where the browsed webpage comes.

At step 209 in FIG. 2, a potential focal block of the target webpage is predicted based on the focal feature. According to one embodiment of the present invention, if the focal feature includes the location of the actual focal block in the browsed webpage and the size of the actual focal block, then at step 209, a block in the target webpage that has a similarity degree greater than a predetermined threshold with respect to the location and size of the actual focal block in the browsed webpage is further identified as the potential focal block. Further, at step 209, it can be determined whether or not the similarity degree of a block in the target webpage with respect to the location of the actual focal block is greater than a particular threshold and whether or not the similarity degree of the block size is also greater than a predetermined threshold, respectively; or at step 209, it can also be determined whether or not the weight summed similarity degree of the location and size of a block in the target webpage with respect to the location and size of the actual focal block is greater than a predetermined threshold. For example, block 3B6 in FIG. 3 is relatively similar in location and size with respect to block 4B6 in FIG. 4A, thus the block 4B6 in FIG. 4A can be identified as the potential focal block.

According to a further embodiment of the present invention, if the focal feature of the actual focal block of the browsed webpage includes the topic of the actual focal block, then at step 209, the block of the target webpage that has a similarity degree greater than a predetermined threshold with respect to the topic of the actual focal block is identified as the potential focal block.

According to a still further embodiment of the present invention, if the focal feature includes the location of the actual focal block in the browsed webpage, the size of the actual focal block and the topic of the actual focal block, then at step 209, a block in the target webpage that has a similarity degree greater than a predetermined threshold with respect to the location, size, and topic of the actual focal block in the browsed webpage is further identified as the potential focal block.

Figure 4B:
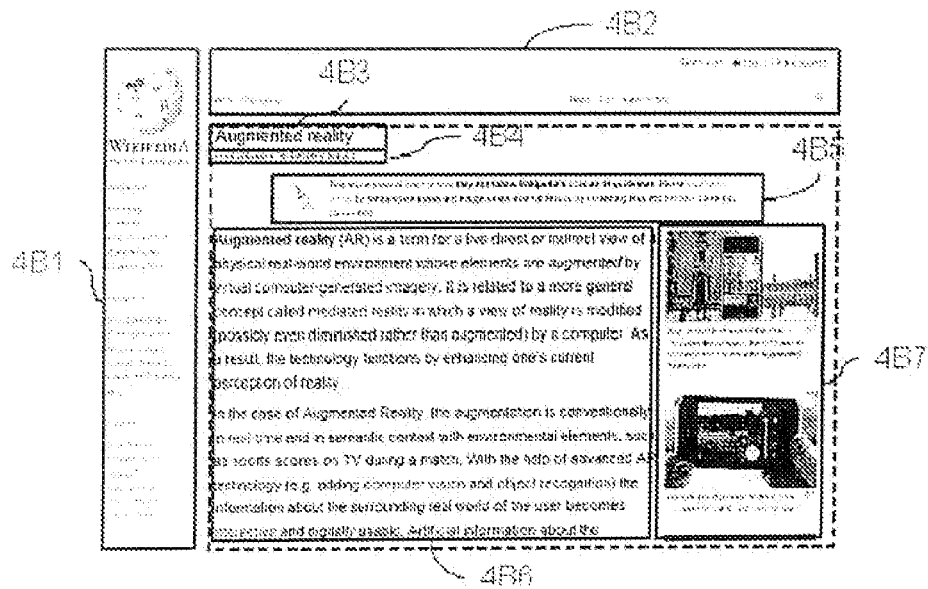
FIG. 4B illustrates a diagram of a target webpage with a focal block being magnified according to one embodiment of the present invention.

At step 211 in FIG. 2, the display of the target webpage is adjusted. According to one embodiment of the present invention, at step 211, content of the focal block of the target webpage is further magnified. FIG. 4B illustrates a diagram of a target webpage with a focal block being magnified according to one embodiment of the present invention. It can be seen that the font of block 4B6 in FIG. 4B is magnified compared with the font of block 4B6 in FIG. 4A, while other blocks in the webpage do not change.

Figure 4C:
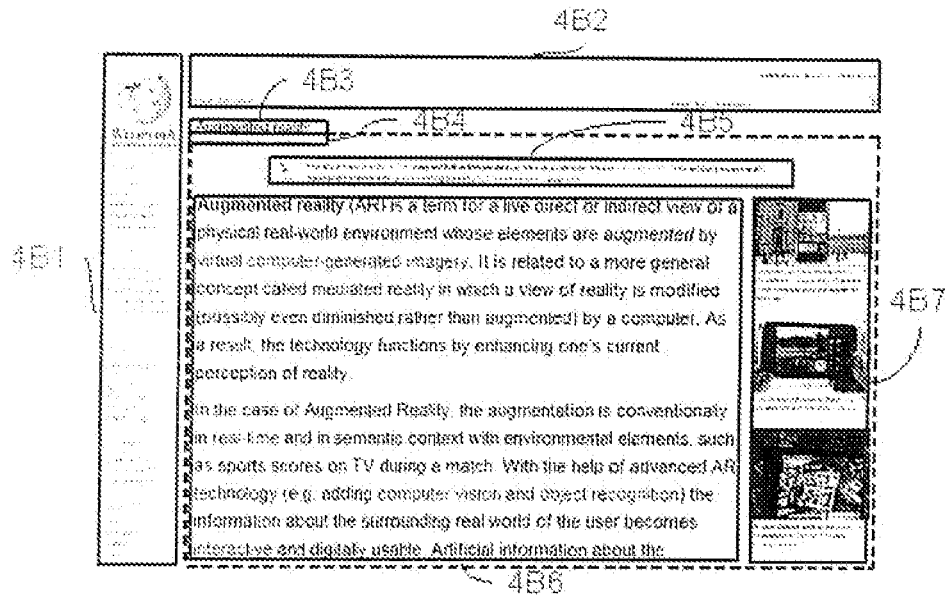
FIG. 4C illustrates a diagram of a target webpage with a focal block being magnified but with a non-focal block being minified according to one embodiment of the present invention.

According to another embodiment of the present invention, the method for automatically adjusting a webpage further includes predicting a potential non-focal block of the target webpage. In the target webpage, blocks other than the potential focal block are regarded as potential non-focal blocks. Display of the target webpage can be adjusted based on the location, size, topic, type (for example, picture or letter), and other factors of potential non-focal blocks, including magnifying the content of the potential focal block and minifying the content of the potential non-focal blocks. For example, if the content of potential non-focal blocks is a picture, then the size of the potential non-focal blocks is minified; or if the letter size of the potential non-focal blocks can be further reduced, then the letter size of the potential non-focal blocks is reduced. FIG. 4C illustrates a diagram of a target webpage with a focal block being magnified and a non-focal block being minified according to one embodiment of the present invention. From FIG. 4C, it can be clearly seen that the font of block 4B6 is notably magnified, and the size of block 4B7 is notably reduced. In the case that the accuracy of predicting a potential non-focal block is relatively high, by using the method in this embodiment, the content of the focal block can be further magnified, thereby utilizing the screen resources more efficiently.

Figure 4D:
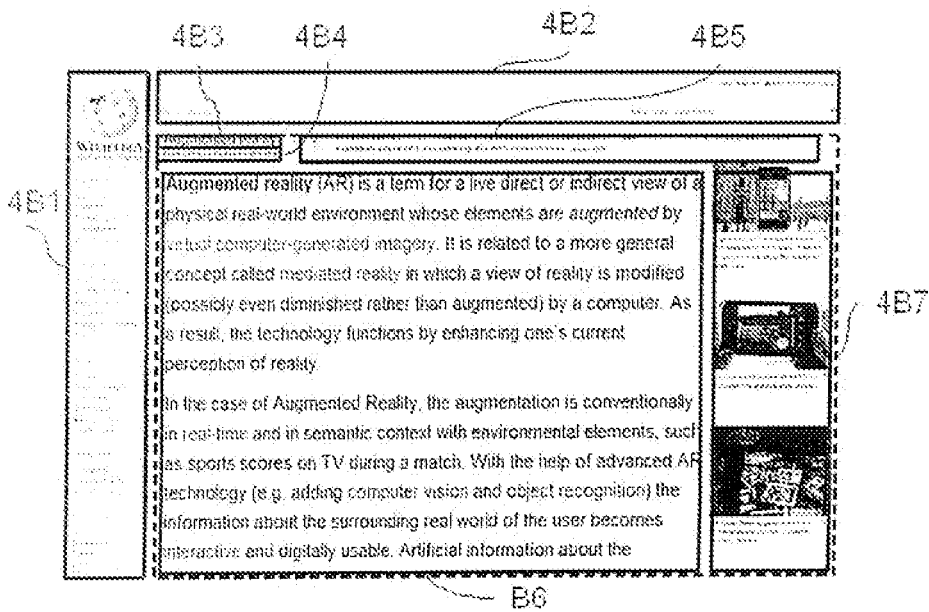
FIG. 4D illustrates a diagram of a target webpage with a focal block being magnified and with a webpage layout being re-organized according to one embodiment of the present invention.

According to a further embodiment of the present invention, step 211 in FIG. 2 can further include re-organizing the layout of the target webpage. Re-organizing the layout enables the screen resources to be utilized more compactly. In other words, it minifies unnecessary blank areas to a certain extent. FIG. 4D illustrates a diagram of a target webpage with a focal block being magnified and a webpage layout being re-organized according to one embodiment of the present invention. It can be seen from FIG. 4D that the location of block 4B5 is re-organized, which minifies the blank area in the screen and makes the content displayed in the screen more compact.

According to an embodiment of the present invention, the browsed webpage in the method for automatically adjusting a webpage and the target webpage are requested by the same user. The potential focal block as predicted out in this manner has more personalized features.

According to another embodiment of the present invention, the browsed webpage and the target webpage are requested by different users. In this way, a potential focal block of a user can be predicted based on popular browsing habits.

Figure 5:
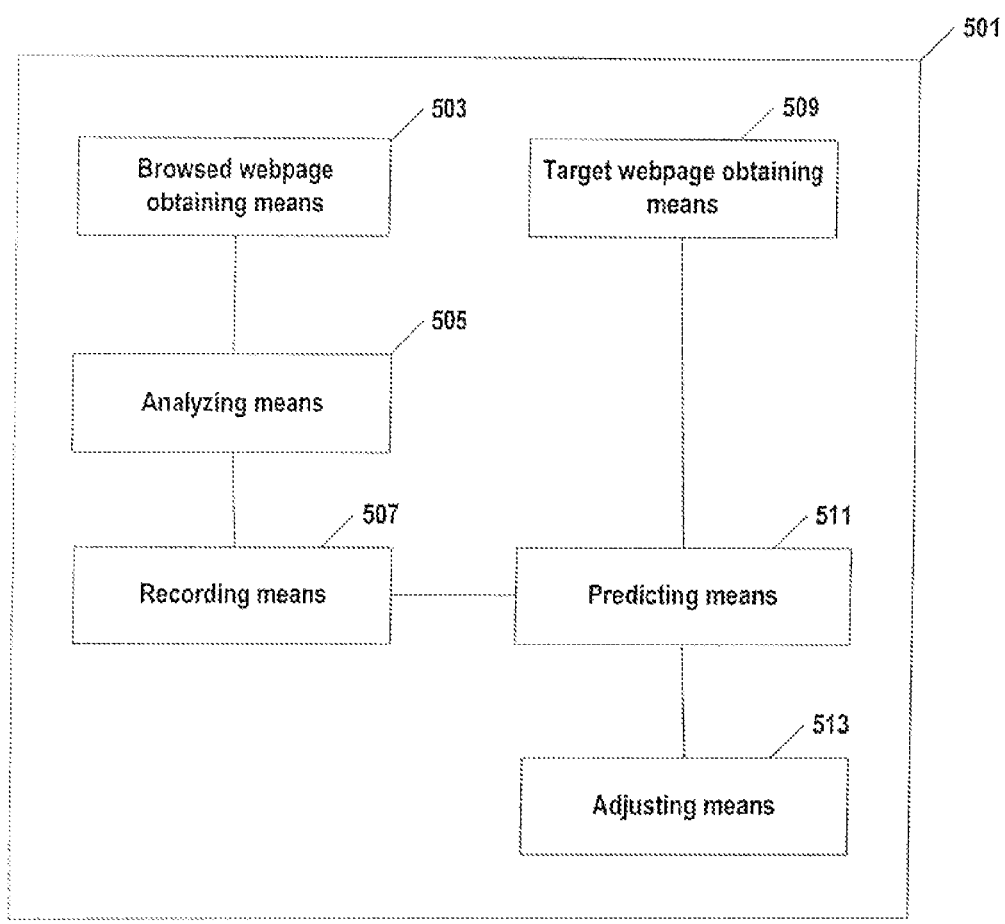
FIG. 5 illustrates a block diagram of a system for automatically adjusting a webpage.

FIG. 5 illustrates a block diagram showing a system for automatically adjusting a webpage. The system for automatically adjusting a webpage 501 as illustrated in FIG. 5 includes: a browsed page obtaining means 503 configured to obtain a browsed webpage; an analyzing means 505 configured to analyze the browsed webpage to identify an actual focal block in the browsed webpage; a recording means 507 configured to record a focal feature of the actual focal block of the browsed webpage; a target webpage obtaining means 509 configured to obtain a target webpage; a predicting means 511 configured to predict a potential focal block of the target webpage based on the focal feature; and an adjusting means 513 configured to adjust display of the target webpage.

According to an embodiment of the present invention, the system for automatically adjusting a webpage 501 further includes a browsed webpage partitioning means (not shown) and a target webpage partitioning means (not shown). The browsed webpage partitioning means is configured to partition the browsed webpage into a plurality of blocks. The target webpage partitioning means is configured to partition the target webpage into a plurality of blocks.

According to another embodiment of the present invention, the analyzing means 505 is further configured to score a block in the browsed webpage based on at least one or more of the following items: block location score $S_1$, block size score $S_2$, mouse state score $S_3$ and browsing record score $S_4$.

According to another embodiment of the present invention, the focal feature of the actual focal block of the browsed webpage includes the location of the actual focal block in the browsed webpage and the size of the actual focal block, and where the predicting means 511 is further configured to identify as the potential focal block a block in the target webpage that has a similarity degree greater than a predetermined threshold with respect to the location and size of the actual focal block in the browsed webpage.

According to another embodiment of the present invention, the focal feature of the actual focal block of the browsed webpage includes the topic of the actual focal block, and the predicting means 511 is further configured to identify as the potential focal block a block of the target webpage that has a similarity degree greater than a predetermined threshold with respect to the topic of the actual focal block.

According to another embodiment of the present invention, the target webpage includes the requested webpage.

According to another embodiment of the present invention, the target webpage includes a requested webpage that has a similarity degree greater than a threshold with respect to the browsed webpage, and the system for automatically adjusting a webpage 501 further includes: a determining means (not shown) configured to determine whether or not the requested webpage has a similarity degree greater than a threshold with respect to the browsed webpage from at least one of the following items: a webpage layout, a webpage topic, a webpage type, and a webpage URL.

According to another embodiment of the present invention, the adjusting means 513 is further configured to magnify content of the focal block of the target webpage.

Other functions that are capable of being performed by the system for automatically adjusting a webpage 501 in FIG. 5 are similar to the depiction of the method for automatically adjusting a webpage as illustrated in FIG. 2, which will not be detailed here.

An embodiment of the present invention provides a computer readable article of manufacture tangibly embodying non-transitory computer readable instructions which, when executed, cause a computer to carry out the steps of a method for automatically adjusting a webpage, the method including the steps of obtaining a browsed webpage; analyzing the browsed webpage to identify an actual focal block in the browsed webpage; recording a focal feature of the actual focal block of the browsed webpage; obtaining a target webpage; predicting a potential focal block of the target webpage based on the focal feature; and adjusting display of the target webpage.

The present invention can be implemented at a client end Client or at a server end Server. The server end can be gate server, a portal website server, a server performing special functions, or any other servers that are capable of implementing the present invention.

One skilled in the art can appreciate that the present invention can be embodied as a system, a method, or a computer program product. Thus, the present invention can be specifically implemented in the following manners, namely, complete hardware, or a combination of software part and hardware part as generally called "circuit," "module," or "system" in this text. Further, the present invention can adopt a form of computer program product as embodied in any tangible medium of expression, the medium including computer-usable program code.

Any combination of one or more computer-usable or computer-readable media can be used. The computer-usable or computer-readable medium can be for example, but not limited to, electrical, magnetic, optical, electromagnetic, infrared, or semiconductor system, means, device, or propagation medium. More specific examples (non-exhaustive list) of the computer-readable medium include the following: a portable computer magnetic disk, hard disk, random access memory (RAM), read-only memory (ROM), erasable programmable read-only memory (EPROM or flash disk), optical fiber, portable compact disk read-only memory (CD-ROM), an optical storage device, or a magnetic storage device. It should be noted that the computer-usable or computer readable medium can even be a paper or other suitable media printed with a program thereon, because the program can be obtained electronically by electrically scanning such paper or other media, and then compiled, interpreted or processed in a suitable manner, and if necessary, stored in a computer memory.

In the context of the present document, a computer-usable or computer-readable medium can be any medium containing, storing, communicating, propagating, or transmitting a program usable for an instruction execution system, apparatus or device, or associated with the instruction execution system, apparatus, or device. A computer-usable program code can be transmitted by any suitable medium, including, but not limited to, wireless, wire, cable, or RF.

A computer program code for executing operations of the present invention can be complied by any combination of one or more program design languages, the program design languages including object-oriented program design languages, such as Java, Smalltalk, and C++, as well as conventional procedural program design languages, such as "C" program design language or similar program design languages. A program code can be completely or partly executed on a user computer, or executed as an independent software package, partly executed on the user computer and partly executed on a remote computer, or completely executed on a remote computer or server. In the latter circumstance, the remote computer can be connected to a user computer through various kinds of networks, including local area network (LAN) or wide area network (WAN), or connected to an external computer (for example using an internet service provider via Internet).

Heretofore, the present invention has been described with reference to the method, apparatus (system) and flow chart and/or block diagram of the computer program product according to the embodiments of the present invention. It should be understood that each block in the flow charts and/or block diagrams and combination of each block in the flow charts and/or block diagrams can be implemented by computer program instructions. These computer program instructions can be provided to a processor of a general purpose computer, a dedicated computer or other programmable data processing apparatus, thereby generating a machine such that these instructions executed through the computer or other programmable data processing apparatus generate means implement functions/operations prescribed in the blocks of the flow charts and/or block diagrams.

These computer program instructions can also be stored in a computer-readable medium capable of instructing the computer or other programmable data processing apparatus to work in a particular manner, such that the instructions stored in the computer-readable medium generate a product including instruction means for implementing the functions/operations prescribed in the flow charts and/or block diagrams.

The computer program instructions can also be loaded on a computer or other programmable data processing apparatus, such that a series of operation steps are executed on the computer or other programmable data processing apparatus, to generate a computer-implemented process, such that execution of the instructions on the computer or other programmable apparatus provides a process of implementing the functions/operations prescribed in the blocks of the flow charts and/or block diagrams.

The flowcharts and blocks in the accompanying drawings illustrate the system, methods, as well as architecture, functions and operations executable by a computer program product according to the embodiments of the present invention. In this regard, each block in the flowcharts or block diagrams can represent a module, a program segment, or a part of code, which contains one or more executable instructions for implementing prescribed logic functions. It should also be noted that in some alternative implementations, functions indicated in blocks can occur in an order differing from the order as shown in the accompanying drawings. For example, two blocks shown consecutively can be performed in parallel substantially or in an inverse order sometimes. This depends on functions involved. It should also be noted that each block in the block diagrams and/or flowcharts and a combination of blocks in the block diagrams and/or flowcharts can be implemented by a dedicated hardware-based system for performing prescribed functions or operations or by a combination of dedicated hardware and computer instructions.

The terms as used herein are only for describing specific embodiments, but not intended to limit the present invention. The phrases "a" and "the" in singular form herein are intended also to include a plural form, unless otherwise specified in the context. It should be further known that when the words "comprising", "including" or "include" is used in the present specification, it indicates existence of a feature, unity, step, operation, unit and/or component as set forth, but it does not exclude existence or addition of one or more other features, unities, steps, operations, units and/or components, and/or the combination thereof.

The corresponding structure, material, operation, and all equivalent replacements of functionally limited means or steps in the claims are intended to include any structure, material or operation for performing the function in combination with other units as specifically set forth in the claims. The provided description of the present invention is intended for illustration and depiction, which is not for exhaustion, or limiting the present invention to the expressed manner. To a person of normal skill in the art, many modifications and variations can be apparently allowed without departing from the scope and spirit of the present invention. Selection and illustration of the embodiments are for better explaining the principle and actual application of the present invention such that a person of normal skill in the art can understand that the present invention can have various embodiments with various kinds of changes suitable for the required specific use.

We claim:

1. A method for automatically adjusting a webpage, comprising:
    obtaining a browsed webpage;
    analyzing the browsed webpage to identify an actual focal block of the browsed webpage;
    recording a focal feature of the actual focal block of the browsed webpage;
    obtaining a target webpage;
    predicting a potential focal block of the target webpage based on the focal feature by identifying, as the potential focal block, a block in the target webpage that has a similarity degree greater than a predetermined threshold with respect to at least one feature of the actual focal block; and
    adjusting display of the target webpage.

2. The method of claim 1, further comprising:
    partitioning the browsed webpage into a plurality of blocks; and
    partitioning the target webpage into a plurality of blocks.

3. The method of claim 1, wherein analyzing the browsed webpage to identify an actual focal block of the browsed webpage comprises:
    scoring a block in the browsed webpage based on at least one of the following items: a block location score, a block size score, a mouse state score, and a browsing record score.

4. The method of claim 3, wherein a total focal score of a block is calculated through the following formula:

$$TS(B_k) = \sum_{i=1}^{N} (w_i * S_i)$$

wherein $B_k$ denotes a $k^{th}$ block; $TS(B_k)$ denotes the total focal score of the $k^{th}$ block; $S_i$ denotes an $i^{th}$ focal score of the $k^{th}$ block; $W_i$ denotes a weight of the $i^{th}$ focal score of the $k^{th}$ block; and N denotes a number of respective focal scores that are employed in calculating the total focal score.

5. The method of claim 1, wherein the focal feature of the actual focal block of the browsed webpage comprises a location of the actual focal block in the browsed webpage and a size of the actual focal block, and wherein predicting a potential focal block of the target webpage based on the focal feature comprises identifying, as the potential focal block, a block in the target webpage that has a similarity degree greater than a predetermined threshold with respect to the location and size of the actual focal block in the browsed webpage.

6. The method of claim 1, wherein the focal feature of the actual focal block of the browsed webpage comprises a topic of the actual focal block, and wherein predicting a potential focal block of the target webpage based on the focal feature comprises identifying, as the potential focal block, a block in the target webpage that has a similarity degree greater than a predetermined threshold with respect to the topic of the actual focal block.

7. The method of claim 1, wherein the target webpage is a requested webpage that has a similarity degree greater than a threshold with respect to the browsed webpage, and the method further comprises:

determining whether or not the requested webpage has a similarity degree greater than a threshold with respect to the browsed webpage from at least one of the following items: a webpage layout, a webpage topic, a webpage type, and a webpage URL.

8. The method of claim 1, wherein adjusting display of the target, webpage comprises magnifying content of the potential focal block.

9. The method of claim 1, further comprising:
predicting non-potential focal blocks of the target webpage, and
wherein adjusting display of the target webpage comprises minifying content of the potential non-focal blocks of the target webpage.

10. The method of claim 1, wherein adjusting display of the target webpage comprises re-organizing layout of the target webpage.

11. The method of claim 1, wherein the browsed webpage and the target webpage are requested by a same user.

12. The method of claim 1, wherein the browsed webpage and the target webpage are requested by different users.

13. A system for automatically adjusting a webpage, comprising:
browsed webpage obtaining means configured to obtain a browsed webpage;
analyzing means configured to analyze the browsed webpage to identify an actual focal block of the browsed webpage;
recording means configured to record a focal feature of the actual focal block of the browsed webpage;
target webpage obtaining means configured to obtain a target webpage;
predicting means configured to predict a potential focal block of the target webpage based on the focal feature by identifying, as the potential focal block, a block in the target webpage that has a similarity degree greater than a predetermined threshold with respect to at least one feature of the actual focal block; and
adjusting means configured to adjust display of the target webpage.

14. The system of claim 13, further comprising:
browsed webpage partitioning means configured to partition the browsed webpage into a plurality of blocks; and
target webpage partitioning means configured to partition the target webpage into a plurality of blocks.

15. The system of claim 13, wherein the analyzing means is further configured to score a block in the browsed webpage based on at least one of the following items: a block location score, a block size score, a mouse state score, and a browsing record score.

16. The system of claim 13, wherein the focal feature of the actual focal block of the browsed webpage comprises a location of the actual focal block in the browsed webpage and a size of the actual focal block, and wherein the predicting means is further configured to identify as the potential focal block a block in the target webpage that has a similarity degree greater than a predetermined threshold with respect to the location and size of the actual focal block in the browsed webpage.

17. The system of claim 13, wherein the focal feature of the actual focal block of the browsed webpage comprises a topic of the actual focal block, and wherein the predicting means is further configured to identify as the potential focal block a block of the target webpage that has a similarity degree greater than a predetermined threshold with respect to the topic of the actual focal block.

18. The system of claim 13, wherein the target webpage is a requested webpage that has a similarity degree greater than a threshold with respect to the browsed webpage, and the system further comprises:

determining means configured to determine whether or not the requested webpage has a similarity degree greater than a threshold with respect to the browsed webpage from at least one of the following items: a webpage layout, a webpage topic, a webpage type, and a webpage URL.

19. The system of claim 13, wherein the adjusting means is further configured to magnify content of the potential focal block of the target webpage.

20. A computer readable article of manufacture tangibly embodying non-transitory computer readable instructions which, when executed, cause a computer to carry out the steps of a method for automatically adjusting a webpage, the method comprising the steps of:

obtaining a browsed webpage;
analyzing the browsed webpage to identify an actual focal block of the browsed webpage;
recording a focal feature of the actual focal block of the browsed webpage;
obtaining a target webpage;
predicting a potential focal block of the target webpage based on the focal feature by identifying, as the potential focal block, a block in the target webpage that has a similarity degree greater than a predetermined threshold with respect to at least one feature of the actual focal block; and
adjusting display of the target webpage.

* * * * *